United States Patent [19]

Fleck et al.

[11] Patent Number: 5,704,048
[45] Date of Patent: Dec. 30, 1997

[54] INTEGRATED MICROPROCESSOR WITH INTERNAL BUS AND ON-CHIP PERIPHERAL

[75] Inventors: Rod Fleck; Werner Boening, both of München, Germany

[73] Assignee: Siemens Aktiengesellschaft, Munich, Germany

[21] Appl. No.: 642,704

[22] Filed: Nov. 2, 1995

Related U.S. Application Data

[63] Continuation of Ser. No. 38,506, Mar. 29, 1993, abandoned.

[30] Foreign Application Priority Data

Mar. 27, 1992 [DE] Germany .................. 92 105 368.2

[51] Int. Cl.⁶ .................... G06F 13/00; G06F 13/40
[52] U.S. Cl. .................... 395/306; 395/308; 395/309; 395/800
[58] Field of Search .................... 395/800, 775, 395/306, 280, 308, 309, 281

[56] References Cited

U.S. PATENT DOCUMENTS

| | | | |
|---|---|---|---|
| 4,349,870 | 9/1982 | Shaw et al. | 395/800 |
| 4,503,500 | 3/1985 | Magar | 395/800 |
| 4,577,282 | 3/1986 | Caudel et al. | 395/800 |
| 4,626,985 | 12/1986 | Briggs | 395/800 |
| 4,969,087 | 11/1990 | Tanagawa et al. | 395/800 |
| 5,084,814 | 1/1992 | Vaglica et al. | 395/325 |
| 5,086,407 | 2/1992 | McGarity et al. | 395/800 |
| 5,088,027 | 2/1992 | Tanagawa et al. | 395/575 |
| 5,113,369 | 5/1992 | Kinoshita | 395/325 |
| 5,151,986 | 9/1992 | Langan et al. | 395/550 |
| 5,157,772 | 10/1992 | Watanbe | 395/325 |
| 5,179,668 | 1/1993 | Ejima et al. | 395/275 |
| 5,414,866 | 5/1995 | Ohmae | 395/800 |
| 5,428,746 | 6/1995 | Dalrymple | 395/306 |
| 5,432,949 | 7/1995 | Baba | 395/800 |
| 5,530,906 | 6/1996 | Cho et al. | 395/881 |
| 5,596,765 | 1/1997 | Baum et al. | 395/800 |
| 5,613,078 | 3/1997 | Kishigami | 395/306 |
| 5,623,687 | 4/1997 | Yishay et al. | 395/800 |

FOREIGN PATENT DOCUMENTS

| | | |
|---|---|---|
| 0159548 | 10/1985 | European Pat. Off. . |
| 0243113 | 10/1987 | European Pat. Off. . |
| 0315275 | 5/1989 | European Pat. Off. . |
| 0466970 | 1/1992 | European Pat. Off. . |

OTHER PUBLICATIONS

"The Architecture and Applications of the Motorola DSP 56000 Digital Signal Processor Family" IEEE, vol. 1, 1987, pp. 523–526.
European Search Report.

*Primary Examiner*—Gopal C. Ray
*Attorney, Agent, or Firm*—Herbert L. Lerner; Laurence A. Greenberg

[57] ABSTRACT

A microprocessor assembly includes an integrated microprocessor and an external bus having a plurality of signal lines and a corresponding number of terminals connected to the integrated microprocessor. The integrated microprocessor includes a plurality of terminals; a core processor; at least one quasi-external bus having a plurality of signal lines; a bus control unit connecting the core processor to the quasi-external bus; a device connecting the quasi-external bus to the external bus through a corresponding number of terminals; and at least one peripheral connected to the quasi-external bus. The quasi-external bus has at least the same number of signal lines carrying the same signal as the external bus, and the quasi-external bus has the same control performance as the external bus, for connecting a peripheral without modification to both the external bus and the quasi-external bus.

19 Claims, 2 Drawing Sheets

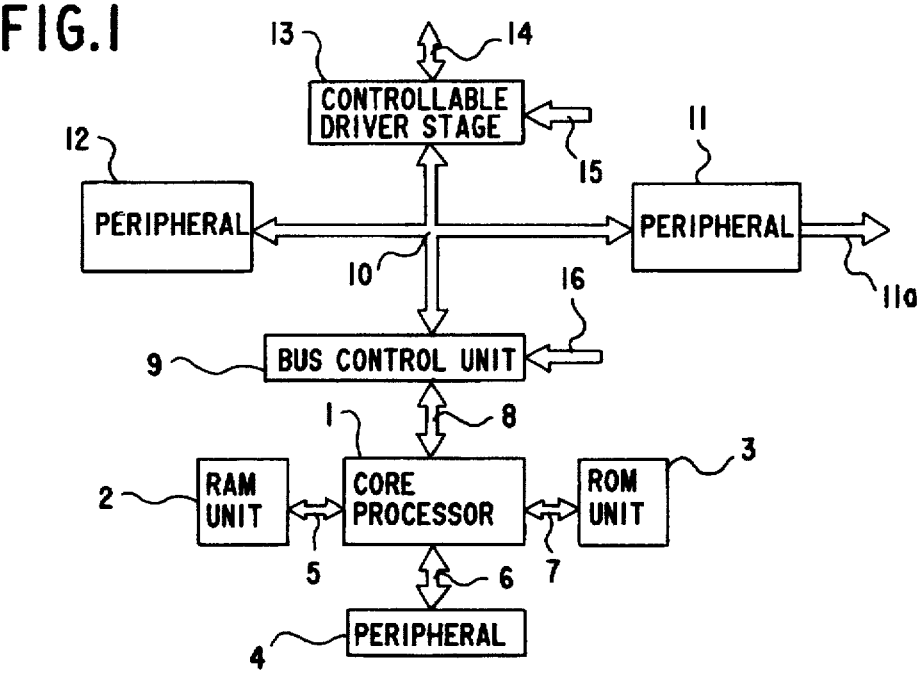
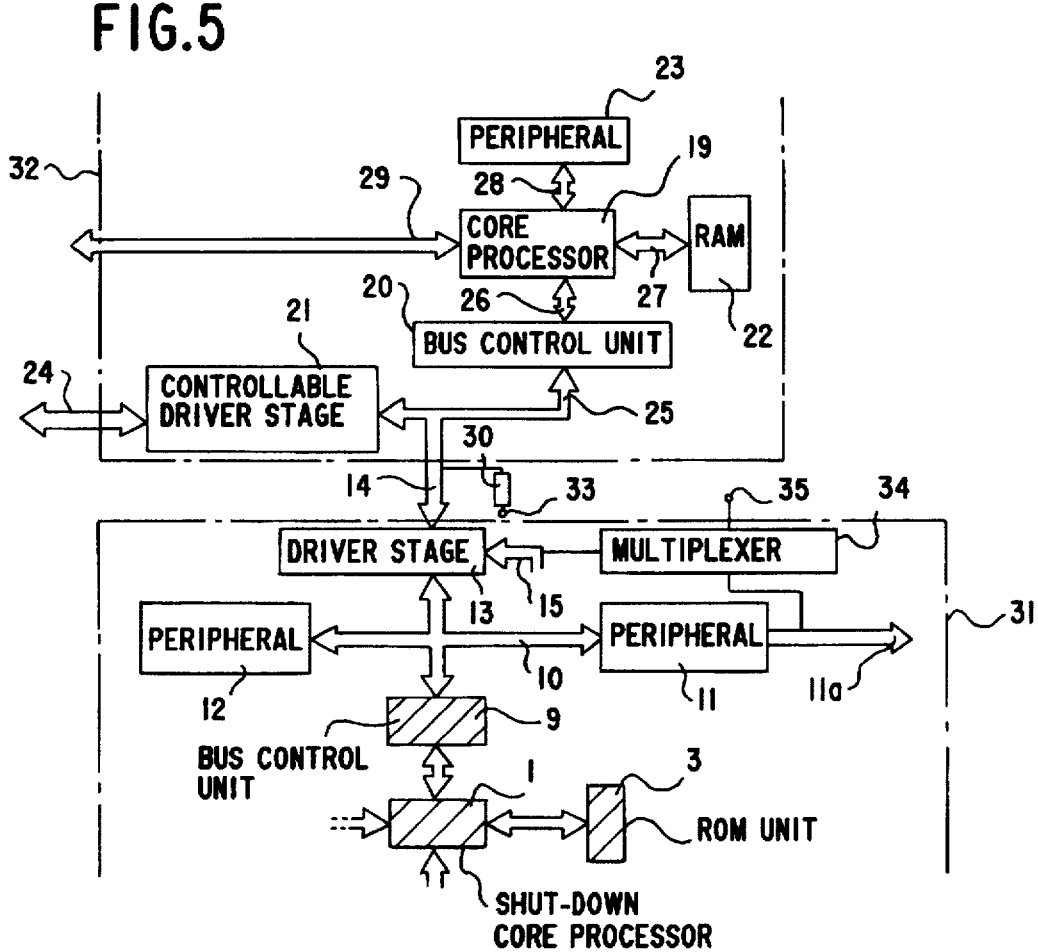

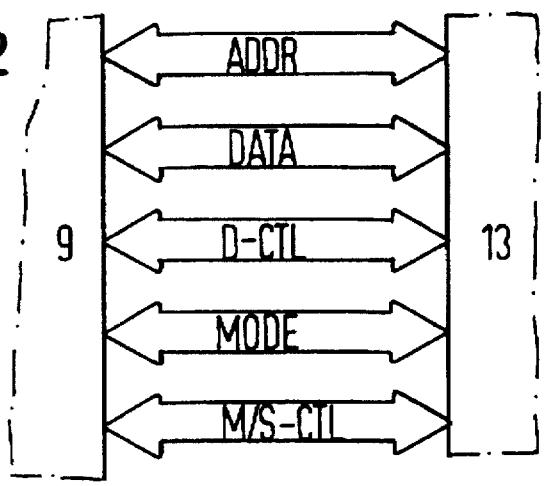
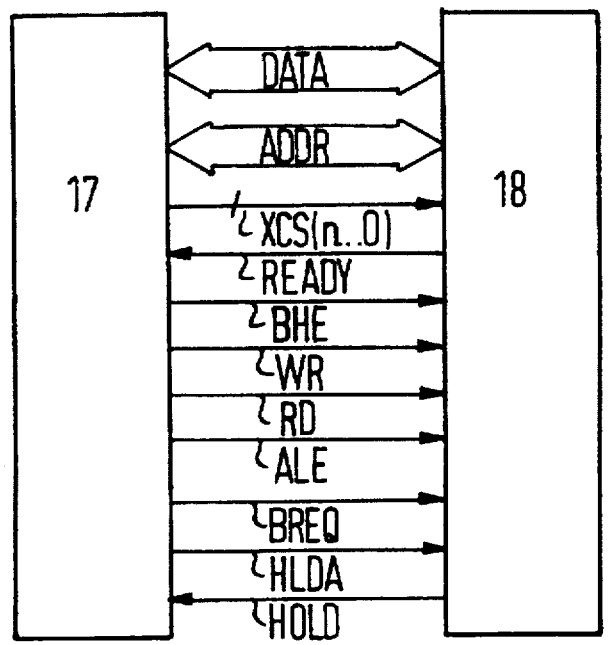
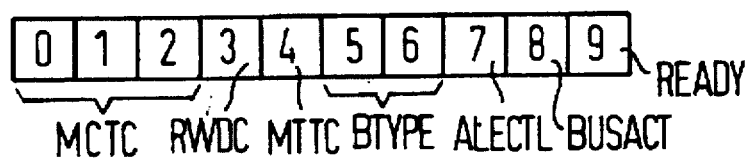

INTEGRATED MICROPROCESSOR WITH INTERNAL BUS AND ON-CHIP PERIPHERAL

This application is a continuation of application Ser. No. 08/038,506, filed Mar. 29, 1993, now abandoned.

BACKGROUND OF THE INVENTION

1. Field of the Invention

The invention relates to an integrated microprocessor.

Such a microprocessor is described in the publication entitled: elektronik report [Electronic Report] 10A, October 1990, pp. 58 ff, for example. In particular, the figure on page 59 of that publication shows the basic configuration of such a microprocessor. The microprocessor described therein includes a core processor and various peripherals, that is a serial I/O timer and a DMA controller.

All of those units are connected to one another through a quasi-external bus or an intermodule bus. A bus control unit which is also provided and is called a system interface, connects an externally connectable bus to the quasi-external bus.

The quasi-external bus of such configurations is usually adapted to the peripherals located inside such a microprocessor and to the central arithmetic unit or core processor. The bus control unit serves to convert the signals of the quasi-external bus in such a way that they are adapted to the timing of the external bus. For the sake of saving space and expense, existing configurations having such a microprocessor and peripherals that are connected to the external bus must often be integrated into a single component.

In a configuration in accordance with the figure on page 59 of the aforementioned publication, the entire triggering and coupling unit of the peripheral must be adapted to the quasi-external bus, in order for that kind of external peripheral to be coupled to the quasi-external bus and thus jointly integrated with it.

That is learned particularly from column 1, page 60, which describes the fact that an externally connected DMA component works more slowly than a jointly integrated DMA component. In addition, the addressing area of the quasi-external bus is often limited, so that coupling to the quasi-external bus at the address that pertained upon connection to the external bus can no longer be achieved, and therefore a new address and decoding are then necessary.

Moreover, jointly integrated peripherals cannot be tested in the same way with currently typical test patterns, the way that stand-alone components can be. That means considerable development effort and expense, which often leads to undesirably long development times.

It is accordingly an object of the invention to provide an integrated microprocessor, which overcomes the hereinafore-mentioned disadvantages of the heretofore-known devices of this general type.

SUMMARY OF THE INVENTION

With the foregoing and other objects in view there is provided, in accordance with the invention, a microprocessor system, comprising an integrated microprocessor; and an external bus having a plurality of signal lines and a corresponding number of terminals connected to the integrated microprocessor; the integrated microprocessor including a plurality of terminals; a central or core processor; at least one quasi-external bus having a plurality of signal lines; the quasi-external bus having at least the same number of signal lines carrying the same signal as the external bus, and the quasi-external bus having the same control performance or behavior as the external bus, for connecting a peripheral without modification to both the external bus and the quasi-external bus; a bus control unit connecting the core processor to the quasi-external bus; connecting means connecting the quasi-external bus to the external bus through a corresponding number of terminals; and at least one peripheral connected to the quasi-external bus.

In accordance with another feature of the invention, there are provided means for generating at least one control signal as a function of an operating mode of the quasi-external bus and for delivering the at least one control signal to at least one of the signal lines of the quasi-external bus.

In accordance with a further feature of the invention, the connecting means are in the form of a controllable driver stage, the driver stage driving each bus signal from the quasi-external bus to the external bus or from the external bus to the quasi-external bus, as a function of at least one control signal of the bus control unit.

In accordance with an added feature of the invention, the controllable driver stage decouples the quasi-external bus from the external bus as a function of a control signal.

In accordance with an additional feature of the invention, the controllable driver stage switches a signal state of at least one of the signal lines of the quasi-external bus to the external bus as a function of a control signal present at one of the terminals of the microprocessor.

In accordance with yet another feature of the invention, the bus control unit decouples the core processor from the quasi-external bus as a function of a signal applied to one of the terminals of the microprocessor, and the driver stage is controlled for coupling the external bus to the quasi-external bus.

In accordance with yet a further feature of the invention, the core processor is decoupled from the quasi-external bus and the driver stage is controlled for coupling the external bus to the quasi-external bus, as a function of a signal present at one of the buses.

In accordance with yet an added feature of the invention, the bus control unit has at least one control register with contents determining the operating mode of the quasi-external bus and the external bus.

In accordance with yet an additional feature of the invention, a signal present at one of the terminals determines the operating mode of the quasi-external bus and the external bus, during a reset signal delivered from the outside.

In accordance with again another feature of the invention, there are provided additional terminals being directly connected to the signal lines of the quasi-external bus.

In accordance with again a further feature of the invention, there are provided connecting means are a controllable driver stage, the microprocessor is a first microprocessor, and there is provided a second microprocessor having a second quasi-external bus and a second controllable driver stage, the second internal bus being connected through the additional terminals and through the controllable driver stage of the first microprocessor to the quasi-external bus of the first microprocessor.

In accordance with again an added feature of the invention, there are provided means for switching the microprocessor to an operating mode in which the core processor and all of the other units, except for the quasi-external bus, the connecting means and the peripherals connected to the quasi-external bus, are deactivated.

In accordance with again an additional feature of the invention, there are provided means for connecting at least one internal signal line connected to a peripheral, to at least one of the terminals of the microprocessor.

In accordance with still another feature of the invention, one of the buses has at least one selection line; the bus control unit has a control register being associated with each of the at least one selection line and having contents defining an address region; and the at least one selection line is activated or deactivated as a function of addresses present on the bus, given agreement with the address region of the applicable control register.

In accordance with still a further feature of the invention, the bus control unit includes control means for operating the bus either as a multiplexed address-data bus or as a non-multiplexed address-data bus.

In accordance with still an added feature of the invention, the bus control unit has at least one control register with contents defining an address region; and the bus is operated as either a multiplexed address-data bus or as a non-multiplexed address-data bus as a function of addresses present on the bus, given agreement with the address region of the applicable control register.

In accordance with still an additional feature of the invention, the bus control unit has a control register with contents indicating if and for how long a control signal is lengthened on one of the buses.

In accordance with another feature of the invention, the bus control unit includes control means for making a data width of one of the buses programmable.

In accordance with a concomitant feature of the invention, the bus control unit has a control register with contents defining an address region; and one of the buses has a data width being set as a function of addresses present on the bus, given agreement with the address region of the register.

One advantage of the invention is that integrating a previously externally connected peripheral within the integrated configuration requires no new development work or modification, since all of the logic can be adopted unchanged.

Another advantage is that there is no difference whether the peripheral is connected externally or internally, so that no modifications whatever need to be made in the existing system and external bus masters, for instance, can continue to access the now jointly integrated peripherals, as if they were still connected to the external bus.

Another advantage is that as a result of the configuration according to the invention, no software modification whatever is necessary when a peripheral unit is integrated. Since the timing of the internal and external bus is exactly the same, and since as noted above the logic need not be modified, the same addressing process can be used, and in time-critical programming such as timing loops, no modification needs to be made, since the dynamic performance remains unaltered.

Another advantage is that no special emulators are necessary for the real-time hardware emulation. A further advantage is the continued, unaltered testability of the now jointly integrated peripherals. Since nothing in the terminals has changed and all of the test terminals are accessible, the peripheral connected to the quasi-external bus can be tested with the same test patterns and methods as for the earlier standalone component.

Another advantage is that in new development of a peripheral to be integrated, internal connection can be made to the core processor without restrictions, or in other words with just as much convenience as in the case of the external connection. Full bus connection flexibility, full addressing volume, the utilization of chip-select devices, for example, and standardized bus timing are all thus assured. This in turn allows out-sourced development of peripherals in a full custom or ASIC construction regardless of the microprocessor manufacturer.

If peripherals that were previously produced by a certain technology are produced by a new technology as a result of the joint integration, then faster operation of the peripheral can be enabled under some circumstances. Wait states can then be dispensed with. This kind of adaptation is also possible without effort or expense, but might necessitate software modifications.

Other features which are considered as characteristic for the invention are set forth in the appended claims.

Although the invention is illustrated and described herein as embodied in an integrated microprocessor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block circuit diagram of a configuration according to the invention;

FIG. 2 is a fragmentary diagram showing a basic configuration of a quasi-external bus;

FIG. 3 is a diagram showing a version of an external bus for a configuration with a microprocessor and an external peripheral;

FIG. 4 is a diagram showing a version of a control register of a bus control unit; and FIG. 5 is a block circuit diagram showing two microprocessors in an emulation mode.

DESCRIPTION OF THE PREFERRED EMBODIMENT

Referring now to the figures of the drawing in detail and first, particularly, to FIG. 1 thereof, it is seen that reference numeral 1 indicates a central arithmetic unit or core processor. A RAM unit 2 is connected the core processor 1, for instance through a bus 5. A ROM unit 3 is connected to the core processor 1 through a further bus 7. A very fast peripheral 4, such as an AD converter, may also be connected, through a high-speed bus 6. A bus control unit 9 is likewise connected to the core processor 1, through an internal connecting bus 8. A quasi-external bus which is shown at reference numeral 10, connects the bus control unit 9 to external peripherals 11, 12. The peripheral 11 or 12 may, for instance, have additional outputs, which generate or receive function-dictated signals. They may be connected through additional lines 11a to additional terminals of the microprocessor and thereby made accessible from outside. The bus control unit 9 may also be controlled by special signals through control lines 16. A connection of the quasi-external bus 10 to an external bus 14 is performed through a controllable driver stage 13. The driver stage additionally receives signals through control lines 15. In the simplest case, the controllable driver stage 13 may also be dispensed with, and thus the quasi-external bus 10 can simultaneously form the external bus 14.

It is essential to the invention that the quasi-external bus 10 be an exact copy of the external system bus 14. This is made possible by locating the bus control unit 9 on the chip between the quasi-external bus and the core processor, where the bus control unit determines the static and dynamic performance of the buses 10 and 14. Since the quasi-external bus 10 is identical to the external bus 14, the peripheral 11, 12 connected to the quasi-external bus can be operated in precisely the same way as if it were connected to the external bus 14. If an external bus master occupies the system bus 10, 14, then it can access the peripheral 11, 12 in the same way as it accesses other system components over the external bus. In this way, a master/slave mode is possible regardless of whether a peripheral is connected to the external or the quasi-external bus.

If a controllable driver unit 13 is provided, then additional operating modes can be produced. The controllable driver stage 13 is controlled by the bus control unit 9 and/or by additional control signals along the control lines 15. This is necessary in order to indicate to the driver stage 13 the direction in which the signals must be switched. For instance, if the core processor 1 or a master connected to the quasi-external bus 10 accesses a peripheral connected to the external bus 14, then the addresses must be connected from the quasi-external bus 10 to the external bus 14, while conversely the data signals must be carried from the quasi-external to the external bus or vice versa, as a function of a reading or writing access. The same is true for various control signals. This may be attained by means of predetermined control signals 15, for instance.

However, some of the bus lines may also serve to indicate the operating mode. To this end, the bus control unit 9 evaluates the signals delivered to it in such a way that it sets the particular operating mode which is determined from the signals or is desired and indicates this set state on the operating mode lines. The connected peripherals can then evaluate this operating mode and perform appropriate functions. In particular, the driver stage 13 can drive the various bus signals from the quasi-external bus to the external bus or vice versa, as a function of the signals present on the operating mode lines.

In FIG. 2, certain groups of signal lines of a bus according to the invention are shown by way of example. This figure shows the quasi-external bus 10 between the bus control unit 9 and the controllable driver stage 13. The most varied kinds of peripherals may be connected to this bus, but for the sake of simplicity they are not shown. The bus has an address bus ADDR which, in contrast to the usual address buses, can carry signals in both directions. As described above, this is necessary if external bus masters access a peripheral that is connected to the quasi-external bus. A data bus DATA is constructed in the same way as in a conventional bus. However, the data and address buses may also be coupled in such a way that multiplexed address transmission is made possible. The advantage of this is that externally connectable peripherals require fewer connecting lines. Data control lines D-CTL are also provided, and some of them can likewise be operated in both directions. The reason for this is the same as for the address lines. Operating mode lines which were already described above are identified by reference symbol MODE. In this version, they are produced only by the bus control unit 9, and they are signals that are driven unidirectionally. However, these signals may also be produced by the driver stage 13 or by any bus master connected to the quasi-external bus 10. Finally, master/slave control lines M/S-CTL form the termination. Once again, depending on the bus allocation protocol, some of these lines may be operatable in both directions, for instance as described above for the address, data and data control signals. They enable the operation of additional bus masters at both the quasi-external and the external buses 10, 14.

If a bus master is connected to the external bus 14 and accesses a peripheral that is also connected to the external bus 14, then the master connected to the external bus 14 must first gain control over the bus. To that end, it uses one of the M/S-CTL lines to send an inquiry on taking over bus control. However, in the illustrated case, the bus master connected to the external bus 14 requires only the control over the external bus 14. This can be indicated to the bus control unit 9 either by software or a special line among the M/S-CTL bus lines. In the former versions in the prior art, the core processor 1 had to be shut down for this purpose so that the external bus master could gain control over the bus. However, since the external bus master requires control over only the external bus 14 and not over the quasi-external bus 10 as well, since in the case described it is only accessing peripherals connected to the external bus, it suffices for the bus control unit 9 to decouple the external bus 14 from the quasi-external bus 10. This can be performed by the controllable driver stage 13. The external bus master then has the opportunity of communicating with the peripherals connected to the external bus 14, during which time the core processor 1 continues to have the peripherals 11, 12, that are connected to the quasi-external bus 10, available to it. This represents a considerable advantage, since the computation performance is not slowed down in such cases by an external bus master.

However, in the otherwise usual cases, in which an external or quasi-external bus master accesses an internal or external peripheral, the core processor 1 must be shut down as before, in such a way that it cannot access either internal or the external bus 10, 14. However, deactivating the core processor 1 is not necessary. The core processor 1 must merely be decoupled from the quasi-external bus 10. This can be performed through the bus control unit 9. During a DMA access, for instance, which takes place between the internal bus 10 and the external bus 14 or vice versa, the core processor 1 can communicate with the peripherals 2, 3, 4 connected through the additional buses 5, 6, 7.

If a bus master connected to the external bus 14 seeks access to a peripheral 11, 12 connected to the quasi-external bus, then this is indicated to the bus control unit through a signal applied to the terminal of the microprocessor, and the bus control unit 9 decouples the core processor 1 from the quasi-external bus 10. The driver stage 13 has been controlled in such a way that the external bus 14 is coupled to the quasi-external bus 10. This means that the data bus lines continue to operate bidirectionally, that the address lines are produced by the bus master connected to the external bus 14 and are driven in the direction of the quasi-external bus 10 through the controllable driver stage 13, and that the control signals are driven either from or toward the external bus 14, depending on their type. This kind of decoupling of the core processor 1 would also be possible by means of a control through an additional terminal of the microprocessor. This could be the case in a so-called monitor operating mode. The additional terminal would transmit a signal through the additional control lines 15 and/or to the driver stage 13 and the bus control unit 9 and initiate the above-described operating mode. In the monitor operating mode, peripherals, bus masters or processors connected to the external bus can then access the peripheral connected to the quasi-external bus 10 or external bus 14. In the monitor operating mode, a bus master can access peripherals connected to the quasi-external bus 10 synchronously with the quasi-external clock or asynchronously by its own rate.

FIG. 3 shows one version of the external bus 14. An integrated microprocessor is shown at reference numeral 17, and a peripheral connected to the external bus 14 is shown at reference numeral 18. The external bus 14 has the following signal lines in this case, and by way of example they are:

DATA: This part of the bus contains 16 data lines, for example. If the external bus 14 is used as a multiplexed address-data bus as well, as described below, then these lines are also used to transmit the lower address bits. In address transmissions, the addresses are valid only for a certain period of time, such as 15 ns after a trailing edge of an ALE signal. This part of the bus is used primarily for data transmission, which is controlled by a signal RD or WR. The data are applied to the bus by the peripheral while the signal RD is activated, regardless of whether the access is from the core processor 1 or from some other peripheral.

ADDR: This partial bus contains all address lines. For instance, it may be a 24-bit address bus. Signals at this partial bus are valid upon the trailing edge of the ALE signal.

CS(n . . . 0): An active signal on one of these lines is generated by the bus control unit when an address applied to the address bus ADDR matches a specific address in an associated register. These signals accordingly serve the purpose of chip-select control. An activated chip-select signal line thus indicates that a predetermined peripheral is to be addressed. Chip-select signals can be generated for both external and/or internal peripherals.

READY: This signal indicates the end of an access. The use of this control signal can be turned on or off by means of a register in the bus control unit 9. If it is activated, then the peripheral must generate this signal, either if data were written by the peripheral or if the peripheral has read the data. This signal is not needed if the bus control unit is programmed in such a way that it generates so-called wait states. In that case, the access to a peripheral is ended upon the end of this wait state. This signal can be driven both from the quasi-external bus 10 to the external bus 14 and vice BHE: This signal indicates that during the access, the higher order byte is accessed. This signal is needed especially in combination with an address line A0 if access is made over the external or quasi-external bus to a peripheral having a data bus which is only eight bits wide.

WR: In combination with a chip-select, this signal indicates the start of a writing access to a peripheral. The data written on the bus are stable before this signal is activated and remain stable until such time as the signal is deactivated again.

RD: This signal indicates the start of a reading access to a peripheral. This signal controls the data transmission over the data bus, particularly in combination with the chip-select signals XCS.

BREQ: This signal is generated by the bus control unit and indicates that the core processor requires access to the external bus 14. This signal is activated in only two operating modes: the hold and the monitor modes.

HLDA: This signal indicates that the core processor 1 is decoupled from the bus and the external bus master at the quasi-external or external bus has the control over the applicable bus.

HOLD: This signal indicates whether or not an external peripheral is seeking to take control over the bus.

For the sake of simplicity, no other signals have been shown in detail in FIG. 3. For instance, reset, interrupt and clock lines are missing. They may be constructed as usual and provided in accordance with the use of the bus system.

The functions of the control signals may also be determined through the bus control unit 9. For instance, the RD signal can be converted into a combined RD/WR signal, the ALE signal to an address strobe AS, and the WR signal to a data strobe signal DS, depending on the bus mode in which the overall bus configuration is operating at the time.

A further operating mode is known as the visible mode. It can be set either by a signal on a corresponding control signal line of the bus, by software or in other words by setting a bit in a corresponding register, or by a signal delivered through an additional terminal. Typically, accesses that occur on the quasi-external bus 10 are not indicated on the external bus 14. In the visible mode, however, the signals carried on the quasi-external bus are indicated through the driver stage 13 on the external bus 14. This allows the user to trace all of the accesses inside the quasi-external bus 10. Particularly in the development phase of such a microprocessor, the visible mode can lead to rapid error elimination. In this mode, a logic analyzer or so-called trace buffer may be used, for instance.

All of the operating modes described thus far can also be set up by software instead of through special control lines. For that purpose, the bus control unit 9 has various control registers having contents which establish the desired operating mode. Additional control registers may be provided, having contents which each define one address region. The operating mode at a given time is established whenever accesses to certain address regions occur. This may be suitable especially whenever this address-dependent operating mode switchover is combined with the visible mode.

During a reset, all of the driver stages of such a microprocessor, accordingly including the controllable driver stage 13, are typically switched to a high-impedance state. During this reset process, the configuration of the quasi-external bus 10 and the external bus 14 can be preprogrammed. By way of example, the driver stage 13 may provide quasi-external pull-down resistors which, for instance, apply the data bus of the external bus 14 to logical zero. In turn, through pull-up resistors, the user can then apply a certain code word to the data bus that is recognized by the bus control unit 9 during the reset phase. Depending on the code applied to the input of the data bus of the external bus 14, a corresponding operating mode is established. Certain types of operation for peripherals 11, 12 connected to the quasi-external bus 10 can also be predetermined in this way. The selection of various operating modes for both the quasi-external and external buses 10, 14 and for the peripherals 11, 12 connected to that bus is limited merely by the number of inputs of the microprocessor. Naturally, pull-up instead of pull-down and pull-down instead of pull-up resistors, or the like, may be used for code generation. FIG. 4 shows an exemplary version of a control register of the bus control unit 9. Each box represents one bit of such a control register. This kind of control register enables adaptation to various dynamic conditions of the bus. For instance, register locations MCTC make it possible to generate bit 0 through bit 2 wait states that control access to read/write memories. Bit 3, RWDC, enables delayed control of the read/write signals. Through the use of bit 4, MTTC, the tri-state time of the memory can be expanded. Two BTYPE bits 5, 6 indicate the configuration of the external and quasi-external bus 10, 14 which is valid at that time. The ALE signal can be lengthened through the bit 7, ALECTL. Bit 8, BUSACT, indicates whether or not the external bus 14 is activated. Bit 9, READY, indicates whether the bus control unit 9 should generate additional wait states in accordance with the MCTC bit or whether or not the ready signal should be generated by a peripheral itself.

In order to enable communication with any possible peripherals of most various manufacturers without requiring a major hardware expenditure, the quasi-external or external bus 10, 14 may be programmed by such a register in the address-data multiplexing mode or in the non-multiplexed mode. Additional control registers may define address regions that cause an address-dependent setting of the internal and external bus 10, 14. Thus such registers control the bus either as a multiplexed address-data bus or as a non-multiplexed address-data bus, given a match with the particular address region defined by its contents. Particularly when using older components, whose timing is not up to the typical speeds required at present, the dynamic performance of the bus can be defined through the above-described bits of the control register. For instance, a control signal that regulates the address or data transfer can be lengthened, thus enabling such peripherals to be operated with the processor according to the invention.

In addition, control registers may be provided, by way of which the data width of the quasi-external or external bus is programmable. This is especially useful, since many components have only an eight-bit-wide data bus. If such components have a word-type internal organization, all of the accesses from outside must be made through the data bus which is only eight bits wide.

In order to avoid expense for software, the bus may be set to 8 or 16 bits or more, by way of example. This depends merely on the basic data width of the data bus selected and on the peripheral. The control of width of the data bus can also be performed through address-dependent control registers. The contents of these control registers define an address region, and the control registers control the data width of the quasi-external or external bus 10, 14 as a function of the address present on the bus, given a match with the address region at this register.

In developing such complex microprocessors, real-time emulation requires that so-called bondout chips be furnished. Until now, a special bondout chip had to be made available for each derivative of such a microprocessor, or in other words a microprocessor having different types of peripherals. The accommodation according to the invention of the quasi-external bus 10 now means that only a single bondout chip has to be developed and can be used for all of the derivatives with the most varied kinds of peripherals.

FIG. 5 shows such a bondout chip at reference numeral 32. The bondout chip 32 likewise has a core processor 19, which is connected to a RAM 22 and to other peripherals 23 through internal buses 27, 28. Like the microprocessor according to the invention, the bondout chip 32 also has a bus control unit 20 and a quasi-external bus, which in this case is element 25. A controllable driver stage 21 which is also provided connects the quasi-external bus 25 to an external bus 24. As compared with a normal version of a microprocessor, the bondout chip 32 has additional non-illustrated terminals, by way of which the quasi-external bus 25 is carried directly to the outside. A microprocessor, which is likewise constructed according to the invention, is shown at reference numeral 31. The microprocessor 31 is exactly equivalent to that shown in FIG. 1. For the sake of simplicity, no attempt was made to show various peripherals and signal lines. The peripheral 11 generates or receives additional internal or external signals over the lines 11a. One of the internal signal lines is carried through a controllable multiplexer 34 to an external terminal 35 of the microprocessor 31. In this case, the multiplexer 34 is controlled through the driver stage 13. For the sake of simplicity, no attempt was made to show the further course of the internal or external additional signal lines 11a. In particular, signal lines leading onward away from or to the multiplexer 34 are not shown. Likewise, no attempt was made to show the connection of the terminal 35 to the bondout chip 32.

The bondout chip 32 is connected through the quasi-external bus 25, which is carried to the outside through the additional terminals, and through the external bus 14, to the driver stage 13 of the microprocessor 31, which is constructed in accordance with the invention. In addition, in most cases, a ROM bus 29 is carried to the outside through additional terminals. As already described above, the configuration of the microprocessor 31 can be predetermined by a pull-up resistor, which is shown at reference numeral 30 in FIG. 5. This pull-up resistor 30 is connected to one of the data lines of the external bus 14 and symbolically represents the code word that switches the microprocessor to the emulation mode during the reset. The pull-up resistor 30 is connected on the other end with a supply voltage, which is delivered through a terminal 33.

During the reset, the microprocessor 31, which is typically constructed according to the invention is switched into the so-called emulation mode by the pull-up resistor 30. In this mode, all of the control and peripheral units of the microprocessor 31 are deactivated, accept for the peripherals 11, 12 connected to the quasi-external bus 10, and the driver stage 13. In FIG. 5, the deactivated units are shown with shading. The driver stage 13 then couples the quasi-external bus 10 of the microprocessor 31 directly to the quasi-external bus 25 of the bondout chip 32. It does not matter that the driver stage 13 is connected between the quasi-external bus 25 of the bondout chip 32 and the quasi-external bus 10 of the microprocessor 31, because the dynamic and static performance of the quasi-external and external buses are absolutely identical. The core processor 19 of the bondout chip 32 can then access the peripherals 11, 12 of the microprocessor 31 as if they were connected to its quasi-external bus 25, because the bus control unit 13 controls the coupling of the quasi-external bus 10 to the quasi-external bus 25 as if they were connected to one another. The entire configuration with the two microprocessors 31 and 32 has the same terminals leading to the outside as a single microprocessor. In addition, even more control signals can be carried to the outside, for instance for the emulation mode. The multiplexers 33 which can be used for this purpose, by way of example divert an internal interrupt signal, which is transmitted to the shut-down core processor 1, to the terminal 35 which is not used in the emulation mode. This microprocessor 31, 32 created in this way can be used in the particular target system. With only a single bondout chip 32, many derivatives can thus be emulated without having to manufacture a new bondout chip each time.

In the monitor or emulation mode, the same test patterns as previously used for the stand-alone peripheral can be applied to the now jointly integrated peripheral. For instance, real-time in-system trace patterns, logic simulation and production test patterns and the like may be used.

What is claimed is:

1. A microprocessor system, comprising:

an integrated microprocessor; and an external bus having a plurality of signal lines;

said integrated microprocessor, including:

a plurality of terminals each connected to a respective one of said signal lines of said external bus;

a core processor;

at least one quasi-external bus having a plurality of signal lines each carrying a signal with a given timing performance;

said quasi-external bus having at least the same number of signal lines as said external bus, said signal lines including lines carrying control signals, address signals, and data signals;

each signal line of said external bus corresponding to a signal line of said quasi-external bus and carrying a signal corresponding to a respective signal of a corresponding signal line of said quasi-external bus;

each signal line of said external bus having the same timing performance as the respective signal of the corresponding signal line of said quasi-external bus;

a bus control unit connected to said core processor through an internal connecting bus and to said signal lines of said quasi-external bus, said bus control unit generating the signals of said quasi-external bus with said timing performance;

connecting means connecting said quasi-external bus to said external bus through said plurality of terminals and thereby maintaining the timing performance; and at least one peripheral connected to said signal lines of said quasi-external bus.

2. The microprocessor system according to claim 1, including means for generating at least one control signal as a function of an operating mode of said quasi-external bus and for delivering the at least one control signal to at least one of said signal lines of said quasi-external bus.

3. The microprocessor system according to claim 2, wherein said bus control unit has at least one control register, said control register having contents determining an operating mode of said quasi-external bus and said external bus.

4. The microprocessor system according to claim 2, including a signal present at one of said terminals, said signal determining the operating mode of said quasi-external bus and said external bus, during a reset signal delivered from an external source.

5. The microprocessor system according to claim 1, wherein said connecting means include a controllable driver stage, said controllable driver stage driving each bus signal from said quasi-external bus to said external bus and from said external bus to said quasi-external bus, as a function of at least one control signal of said bus control unit.

6. The microprocessor system according to claim 5, wherein said controllable driver stage is operative for decoupling said quasi-external bus from said external bus in response to a control signal.

7. The microprocessor system according to claim 5, wherein said controllable driver stage is operative for switching a signal state of at least one of said signal lines of said quasi-external bus to said external bus in response to a control signal present at one of said terminals of said microprocessor.

8. The microprocessor system according to claim 5, wherein said bus control unit is operative for decoupling said core processor from said quasi-external bus in response to a signal applied to one of said terminals of said microprocessor, and said driver stage is operative for controlling coupling of said external bus to said quasi-external bus.

9. The microprocessor system according to claim 5, including means for decoupling said core processor from said quasi-external bus, said driver stage being operative for coupling said external bus to said quasi-external bus, in response to a signal present at one of said buses.

10. The microprocessor system according to claim 1, including additional terminals being directly connected to said signal lines of said quasi-external bus.

11. The microprocessor system according to claim 10, wherein said connecting means include a controllable driver stage, said microprocessor being a first microprocessor, and a second microprocessor having a second quasi-external bus and a second controllable driver stage, said second quasi-external bus being connected through said additional terminals and through said controllable driver stage of said first microprocessor to said quasi-external bus of said first microprocessor.

12. The microprocessor system according to claim 1 including a sub-microprocessor system composed of said quasi-external bus, said connecting means and said peripherals, and switching means for switching said microprocessor system except less said sub-microprocessor system to an operating mode in which all of said microprocessor including said core processor is deactivated.

13. The microprocessor system according to claim 12, including means for connecting at least one internal signal line connected to a peripheral, to at least one of said terminals of said microprocessor.

14. The microprocessor system according to claim 1, wherein one of said buses has at least one selection line; said bus control unit has a control register being associated with each of said at least one selection lines and having contents defining an address region; and wherein said at least one selection line is activated or deactivated as a function of addresses present on said one of the buses, when in agreement with the address region of said control register.

15. The microprocessor system according to claim 1, wherein said bus control unit includes control means for operating the bus as one of a multiplexed address-data bus and as a non-multiplexed address-data bus.

16. The microprocessor system according to claim 15, wherein said bus control unit has at least one control register with contents defining an address region; and the bus is operated as one of a multiplexed address-data bus and a non-multiplexed address-data bus as a function of addresses present on the bus, when in agreement with the address region of said applicable control register.

17. The microprocessor system according to claim 1, wherein said bus control unit has a control register with contents indicating presence and lengthening of time of a control signal on one of said buses.

18. The microprocessor system according to claim 1, wherein said bus control unit includes program means for programming data width of one of said buses.

19. The microprocessor system according to claim 18, wherein said bus control unit has a control register with contents defining an address region; and one of said buses has a data width being set as a function of addresses present on said bus, when in agreement with the address region of said register.

\* \* \* \* \*